(12) United States Patent
Kitano et al.

(10) Patent No.: US 9,868,267 B2
(45) Date of Patent: Jan. 16, 2018

(54) MULTILAYER STRUCTURE, INNER LINER FOR PNEUMATIC TIRE, AND PNEUMATIC TIRE

(75) Inventors: Hideki Kitano, Yoshikawa (JP); Tetsuo Amamoto, Kodaira (JP); Takatsugu Tanaka, Kokubunji (JP); Nahoto Hayashi, Kurashiki (JP); Masao Hikasa, Kibi chuo-cho (JP); Yusuke Tanaka, Kamisu (JP)

(73) Assignees: BRIDGESTONE CORPORATION, Tokyo (JP); Kuraray Co., Ltd., Kurashiki-shi, Okayama (JP)

( * ) Notice: Subject to any disclaimer, the term of this patent is extended or adjusted under 35 U.S.C. 154(b) by 0 days.

(21) Appl. No.: 14/122,331

(22) PCT Filed: May 31, 2012

(86) PCT No.: PCT/JP2012/003600
§ 371 (c)(1),
(2), (4) Date: Nov. 26, 2013

(87) PCT Pub. No.: WO2012/164945
PCT Pub. Date: Dec. 6, 2012

(65) Prior Publication Data
US 2014/0099490 A1    Apr. 10, 2014

(30) Foreign Application Priority Data

May 31, 2011  (JP) .................................. 2011-122569
May 31, 2011  (JP) .................................. 2011-122631

(51) Int. Cl.
B32B 7/02       (2006.01)
B60C 1/00      (2006.01)
(Continued)

(52) U.S. Cl.
CPC ................ *B32B 7/02* (2013.01); *B32B 25/08* (2013.01); *B32B 27/08* (2013.01); *B32B 27/306* (2013.01);
(Continued)

(58) Field of Classification Search
CPC ....... B32B 25/08; B32B 27/08; B32B 27/306; B32B 7/02; B32B 2250/05;
(Continued)

(56) References Cited

U.S. PATENT DOCUMENTS 5,040,583 A * 8/1991 Lin ........................ B60C 1/0016
                                                        152/510
5,688,890 A * 11/1997 Ishiguro ................. C08G 18/24
                                                        525/440.08
(Continued)

FOREIGN PATENT DOCUMENTS

CN          102046724 A        5/2011
EP          2058359 A1 *       5/2009 ............. B29C 65/14
(Continued)

OTHER PUBLICATIONS

JP 2005306199 A Machine Translation.*
(Continued)

*Primary Examiner* — Maria Veronica Ewald
*Assistant Examiner* — Travis Figg
(74) *Attorney, Agent, or Firm* — Sughrue Mion, PLLC

(57) ABSTRACT

To provide a multilayer structure having high gas barrier property and crack resistance as well as excellent fatigue resistance, an inner liner for a pneumatic tire using such a multilayer structure, and a pneumatic tire comprising the inner liner. According to the present invention, in a multilayer structure 1 including a barrier layer 2 and an elastomer (Continued)

layer 3, a proportion of a thickness of the elastomer layer 3 in the multilayer structure ((U1+U2+ . . . +Un)/T) is 60% or more.

10 Claims, 3 Drawing Sheets

(51) Int. Cl.
    *B32B 25/08*     (2006.01)
    *B60C 5/14*     (2006.01)
    *B32B 27/08*     (2006.01)
    *B32B 27/30*     (2006.01)

(52) U.S. Cl.
    CPC .............. *B60C 1/0008* (2013.01); *B60C 5/14* (2013.01); *B32B 2250/05* (2013.01); *B32B 2250/24* (2013.01); *B32B 2307/552* (2013.01); *B32B 2307/7242* (2013.01); *B32B 2605/08* (2013.01); *B60C 2005/145* (2013.01); *Y10T 428/2495* (2015.01); *Y10T 428/24975* (2015.01); *Y10T 428/31573* (2015.04)

(58) Field of Classification Search
    CPC .......... B32B 2250/24; B32B 2307/552; B32B 2307/7242; B32B 2605/08; B60C 1/0008; B60C 5/145; B60C 5/14; B60C 2005/145; Y10T 428/2495; Y10T 428/24975; Y10T 428/31573
    USPC .................................. 428/212–220; 152/510
    See application file for complete search history.

(56) References Cited

U.S. PATENT DOCUMENTS

| | | | | | |
|---|---|---|---|---|---|
| 5,851,323 | A * | 12/1998 | Kaido | .................. | B60C 1/0008 152/510 |
| 5,938,869 | A * | 8/1999 | Kaido | ................ | B29D 30/0681 152/510 |
| 6,024,816 | A * | 2/2000 | Yamakawa | ........ | B29D 30/0681 152/510 |
| 6,062,283 | A * | 5/2000 | Watanabe | ................. | B60C 1/00 152/510 |
| 6,079,465 | A * | 6/2000 | Takeyama | ............ | B60C 1/0008 152/510 |
| 2009/0242094 | A1 * | 10/2009 | Kato | .................... | B60C 1/0008 152/565 |
| 2010/0108212 | A1 * | 5/2010 | Kameda | ............. | B60C 17/0009 152/154.2 |
| 2010/0181003 | A1 * | 7/2010 | Inoue | ................. | B29D 30/0681 152/564 |
| 2010/0186866 | A1 * | 7/2010 | Tomoi | .................. | B60C 1/0008 152/510 |
| 2010/0307655 | A1 * | 12/2010 | Tanno | ................... | B60C 19/002 152/504 |
| 2010/0314020 | A1 * | 12/2010 | Matsuda | ............... | B60C 1/0008 152/564 |
| 2011/0024015 | A1 * | 2/2011 | Takahashi | ............ | B60C 1/0008 152/510 |
| 2011/0024017 | A1 * | 2/2011 | Miyazaki | ................ | B60C 19/08 152/564 |
| 2011/0108359 | A1 * | 5/2011 | Nishimura | ........... | G10K 11/168 181/290 |
| 2014/0099490 | A1 * | 4/2014 | Kitano | ................. | B60C 1/0008 428/216 |

FOREIGN PATENT DOCUMENTS

| | | | | |
|---|---|---|---|---|
| JP | 01-314164 | A | | 12/1989 |
| JP | 06-040207 | A | | 2/1994 |
| JP | 2002-012002 | A | | 1/2002 |
| JP | 2005306199 | A | * | 11/2005 |
| JP | 2007-509778 | A | | 4/2007 |
| JP | 2007-119614 | A | | 5/2007 |
| JP | 2009-132379 | A | | 6/2009 |
| JP | 2009-263653 | A | | 11/2009 |
| JP | 2009263653 | A | * | 11/2009 ........... B60C 1/0008 |
| JP | 2010-247618 | A | | 11/2010 |
| WO | 2005/044557 | A1 | | 5/2005 |
| WO | 2008/029939 | A1 | | 3/2008 |
| WO | 2007/100159 | A1 | | 9/2015 |

OTHER PUBLICATIONS

Extended European Search Report dated Sep. 29, 2014 in European Patent Application No. 12793465.1.
First Office Action dated Oct. 10, 2014 in corresponding Chinese Patent Application No. 201280037988.8 with English translation.
Communication dated Mar. 12, 2015, issued by the State Intellectual Property Office of the People's Republic of China in corresponding Chinese Application No. 201280037988.8.
Communication dated Jun. 2, 2015 from the Chinese Patent Office in counterpart application No. 201280037988.8.
Communication dated Sep. 15, 2015, from the Japanese Patent Office in corresponding Japanese Application No. 2012-125407.
Kuraray Co., Ltd., "Eval G156", EVAL Trademark, Searched on Sep. 4, 2015, (3 pages total) <URL: http://www.eval.jp/media/56851/g156_iso.pdf>.
Kuraray Co., Ltd., "Eval L171B", EVAL Trademark, Searched on Sep. 4, 2015, (3 pages total) <URL: http://www.eval.jp/media/56827/l171b_iso.pdf>.
Communication dated Dec. 3, 2015, issued by the State Intellectual Property Office of the P.R.C. in corresponding Chinese Application No. 201280037988.8.
Thermoplastic Polyurethane Elastomer Kuramiron™, Kuraray catalog, 2010, in English, 13 pages, obtained from the website: http://www.septon.info/en/about/kuramiron.pdf in 2016.
Shore A and JIS-A hardness document from Japan Patent Office (updated, but after Aug. 31, 1996), obtained from the website: https://www.jpo.go.jp/shiryou/s_sonota/hyoujun_gijutsu/golf_ball/page145.htm in 2016.

* cited by examiner

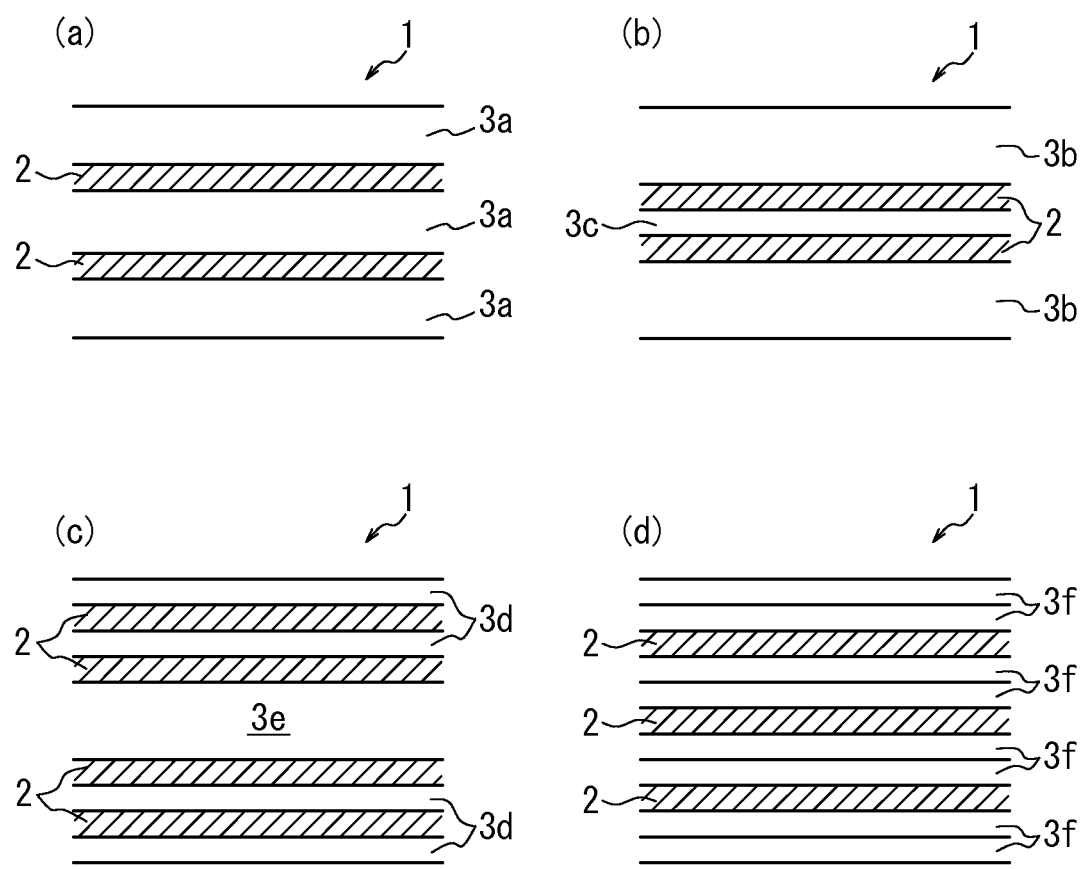

MULTILAYER STRUCTURE, INNER LINER FOR PNEUMATIC TIRE, AND PNEUMATIC TIRE

CROSS REFERENCE TO RELATED APPLICATIONS

This application is a National Stage of International Application No. PCT/JP2012/003600 filed May 31, 2012, claiming priority based on Japanese Patent Application No. 2011-122631 filed May 31, 2011, and Japanese Patent Application No. 2011-122569 filed May 31, 2011, the contents of all of which are incorporated herein by reference in their entirety.

TECHNICAL FIELD

The present invention relates to a multilayer structure comprising a barrier layer and an elastomer layer, and more specifically, to a multilayer structure having high gas bather property and crack resistance as well as excellent fatigue resistance, an inner liner for a pneumatic tire using the multilayer structure, and a pneumatic tire comprising the inner liner.

BACKGROUND ART

For the inner liner disposed as an air barrier layer on an inner surface of a tire for maintaining internal pressure of the tire, a rubber composition mainly made of butyl rubber or halogenated butyl rubber is commonly used. However, since the rubber composition mainly made of the butyl rubber has a low air bather property, the inner liner using such a rubber composition needs to have a thickness of around 1 mm.

On the other hand, ethylene-vinyl alcohol copolymer (hereinafter, it may be abbreviated as EVOH) is known to have an excellent gas barrier property. Since an air transmission amount of the EVOH is hundredth part or less than that of the rubber composition used for the butyl-based inner liner described above, an inner liner made of EVOH with a thickness of 100 μm or less may significantly improve internal pressure retention of the tire. The inner liner made of EVOH with the thickness of 100 μm or less is usable and hardly breaks or causes cracks due to bending deformation at the time of tire rolling. Hence, it may be said that, in order to improve the internal pressure retention of a pneumatic tire, it is effective to use EVOH for the inner liner of the tire. Patent Document 1, for example, discloses a pneumatic tire comprising an inner liner made of EVOH.

However, when normal EVOH is used for the inner liner, while it is very effective in improving the internal pressure retention of the tire the inner liner made of EVOH has been broken or causing cracks due to deformation during bending due to its elastic modulus significantly higher than that of rubber commonly used for the tire. Thus, when the inner liner made of EVOH is used, although the internal pressure retention of the tire before use of the tire is greatly improved, a used tire subjected to bending deformation during tire rolling sometimes has the internal pressure retention lower than that before use.

Accordingly, development of an inner liner that has high crack resistance while maintaining the gas barrier property and allows a reduction in thickness has been desired. To that end, it is considered to use a laminated product in which an elastic film or a sheet with excellent crack resistance and a resin film with excellent gas barrier property are joined to each other and integrated. In such a case, since the elastic film or the like is contained in the laminated product, it becomes a question whether an excellent gas barrier property may be achieved. Further, when the laminated product is used as the inner liner, improvement in fatigue resistance to be durable for a prolonged use has been desired.

RELATED ART DOCUMENT

Patent Document

Patent Document 1: Japanese Patent Laid-Open No. 6-40207

SUMMARY OF INVENTION

Technical Problem

As such, an object of the present invention is, by solving the above problem of conventional techniques, to provide a multilayer structure having high gas barrier property and crack resistance as well as excellent fatigue resistance. Also, another object of the present invention is to provide an inner liner for a pneumatic tire using such a multilayer structure and a pneumatic tire comprising the inner liner.

Solution to Problem

As a result of intensive studies of a multilayer structure comprising a barrier layer and an elastomer layer in order to achieve the above objects, the present inventors have found that, by setting a proportion of a thickness of the elastomer layer in the multilayer structure 60% or more, the ratio of the elastomer layer having high flexibility becomes dominant and a plastic deformation amount of the barrier layer having low flexibility may be reduced, decreasing fatigue and ensuring high gas barrier property and crack resistance as well as achieving excellent fatigue resistance. The present inventors have thus accomplished the present invention.

That is, in the multilayer structure according to the present invention including the barrier layer and the elastomer layer, the proportion of the thickness of the elastomer layer in the multilayer structure is 60% or more. Preferably, the proportion of the thickness of the elastomer layer in the multilayer structure is 80% or more.

Preferably, JIS-A hardness of the elastomer layer is 85 or less.

Preferably, elongation at break of the barrier layer is 100% or less, and elongation at break of the elastomer layer exceeds 100%.

Preferably, the multilayer structure is made by laminating the barrier layers and the elastomer layers to form seven or more layers in total. More preferably, these layers are alternately laminated.

Preferably, the barrier layer has oxygen permeability of 10.0 cc·mm/m2·day·atm or less at 20° C. and 65% RH. Also preferably, each barrier layer has a thickness of 10 μM or less.

Preferably, the barrier layer includes one or more resins having a polar group of OH, S, Cl or F, where the resin having the polar group is at least one selected from ethylene-vinyl alcohol copolymer, modified ethylene-vinyl alcohol copolymer, polyvinyl alcohol, nylon, vinyl chloride and ionomer.

Preferably, the elastomer layer contains at least one selected from polystyrene-based thermoplastic elastomer, polyolefin-based thermoplastic elastomer, polydiene-based thermoplastic elastomer, polyvinyl chloride-based thermoplastic elastomer, chlorinated polyethylene-based thermoplastic elastomer, polyurethane-based thermoplastic elastomer, polyester-based thermoplastic elastomer, polyamide-based thermoplastic elastomer and fluorine resin-based thermoplastic elastomer.

Preferably, the barrier layer and the elastomer layer are crosslinked by irradiation of active energy rays and formed by a co-extrusion method.

Preferably, an elastic modulus of the multilayer structure under 100% strain at 20° C. is 40 Mpa or less.

Further, an inner liner for a pneumatic tire according to the present invention is characterized in using the multilayer structure described above, and a pneumatic tire according to the present invention is characterized in having the inner liner.

Effect of the Invention

According to the present invention, a multilayer structure having high gas bather property and crack resistance as well as excellent fatigue resistance may be provided. Also, an inner liner for a pneumatic tire using such a multilayer structure and a pneumatic tire comprising the inner liner may be provided.

BRIEF DESCRIPTION OF DRAWINGS

FIGS. 3(a)-(d) are diagrams illustrating some embodiments of a multilayer structure according to the present invention.

DESCRIPTION OF EMBODIMENT

<Multilayer Structure>

Figure 1:
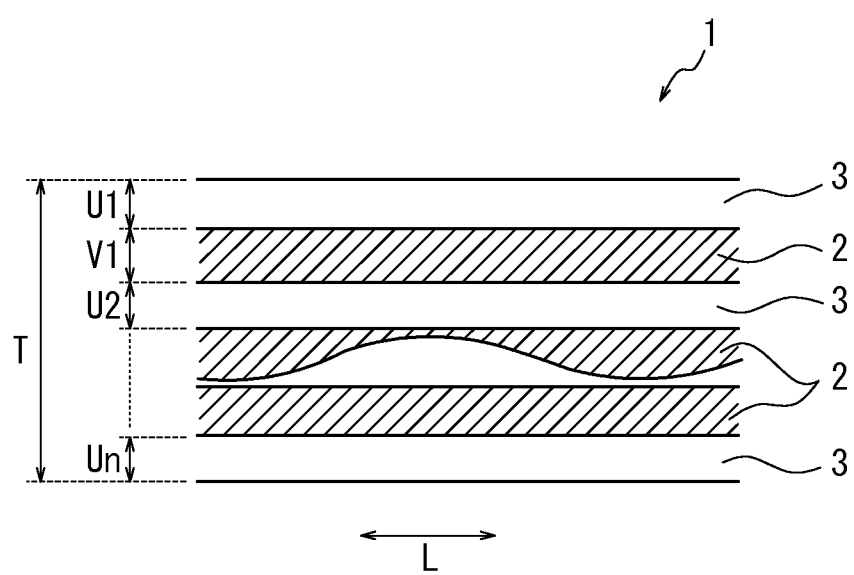
FIG. 1 is a cross-sectional view of an example of a multilayer structure according to the present invention.

The following is a detailed description of a multilayer structure according to the present invention, with reference to the accompanying drawings. FIG. 1 is a cross-sectional view of an example of the multilayer structure according to the present invention.

A multilayer structure 1, as illustrated in FIG. 1, includes a bather layer 2 and an elastomer layer 3.

According to the present invention, a proportion ((U1+U2+ . . . +Un)/T) of a thickness of the elastomer layer 3 in the multilayer structure 1 is 60% or more.

When the bather layer 2 having a high gas barrier property and the elastomer layer 3 having high toughness are laminated, an excellent gas bather property of the multilayer structure 1 may be ensured and also, with a toughness action of the elastomer layer 3, high crack resistance may be obtained.

In addition to the above effect, the multilayer structure 1 of the present invention may obtain excellent fatigue resistance. In a state in which the elastomer layer 3 made of a material with high flexibility like rubber and the barrier layer 2 with low flexibility adhere to each other, when an extension strain is applied in a direction L orthogonal to a laminating direction of the multilayer structure 1 as illustrated in FIG. 1, while the elastomer layer 3 is elastically deformed and restores to its original shape, the bather layer 2 is plastically deformed beyond a proof stress point. Here, when the elastomer layer 3 is thick enough comparing to the barrier layer 2, the elastic deformation becomes dominant in the entire multilayer structure and the barrier layer 2 being plastically deformed is compressed and folded on the elastomer layer 3. When folded, the barrier layer 2, comparing to a conventional barrier layer 2, has higher resistance against a tensile stress in the direction L, whereby elasticity of the entire multilayer structure is increased and plastic deformation may be efficiently suppressed. As a result, it is considered that extremely high fatigue resistance may be obtained.

Here, the reason for setting the proportion ((U1+U2+ . . . +Un)/T) of the thickness of the elastomer layer 3 in the multilayer structure 1 to 60% or more is, when the proportion is less than 60%, a desired fatigue resistance may not be obtained due to insufficient thickness of the elastomer layer 3.

Also, in terms of obtaining superior fatigue resistance, the proportion of the thickness of the elastomer layer in the multilayer structure is preferably 80% or more, more preferably 85% or more, further preferably 90% or more, particularly preferably 95% or more.

In the multilayer structure 1 of the present invention, a lamination method to make the proportion of the thickness of the elastomer layer at 60% or more may employ patterns as illustrated in FIGS. 3(a) to (d), for example. FIG. 3(a) illustrates a multilayer structure 1 having an elastomer layer 3a thicker than the barrier layer 2. FIG. 3(b) illustrates a multilayer structure 1 in which the barrier layers 2 and an elastomer layer 3c both having small thicknesses are sandwiched between thick elastomer layers 3b. FIG. 3(c) illustrates a multilayer structure 1 in which a thick elastomer layer 3e is arranged at a center in a laminating direction of the multilayer structure 1 and sandwiched between the barrier layer 2 and the elastomer layer 3c both having small thicknesses. FIG. 3(d) illustrates a multilayer structure 1 in which, comparing to the barrier layer 2, the number of elastomer layers 3f is greater.

Note that, among the laminating patterns illustrated in FIGS. 3(a) to (d), in terms of obtaining superior fatigue resistance, the multilayer structure 1 illustrated in FIG. 3(b) in which the barrier layers 2 and the elastomer layer 3c are sandwiched between the thick elastomer layers 3b is more preferable.

The multilayer structure 1 of the present invention, in terms of achieving a higher gas barrier property, is preferably made by laminating the elastomer layers 3 and the barrier layers 2 to form seven or more layers in total, more preferably eleven layers or more, particularly preferably fifteen layers or more. An upper limit of the total number of bather layers 2 having the barrier property is preferably, but not particularly limited to, 3000 or less, in terms of reducing a weight of the multilayer structure 1.

Preferably, the barrier layer 2 and the elastomer layer 3 are alternately laminated, as illustrated in FIG. 1. This is because alternate lamination of the barrier layer 2 and the elastomer layer 3 enables obtainment of superior barrier property and crack resistance.

According to the multilayer structure of the present invention, as illustrated in FIG. 1, each of thicknesses $U1$, $U2$, $U3$ . . . and $Un$ of the elastomer layer 3 and each of thicknesses $V1$, $V2$, $V3$ . . . and $Vn$ of the barrier layer 2 are preferably within a range of 0.001 to 40 μm. When both of the thickness U and the thickness V are within the above range, the crack resistance may be improved by enhancing the toughness and the number of layers constituting the multilayer structure may be increased. Accordingly, comparing to a multilayer structure with the same thickness but composed of less number of layers, the gas bather property and the crack resistance of the multilayer structure may be improved.

Also, in terms of achieving higher crack resistance, it is preferable to further reduce the thickness V of each of the barrier layers 2, more preferably 10 µm or less.

For example, although polystyrene may be mentioned as an example of a material used for a conventional bather layer, polystyrene is known as a brittle material and a layer made of polystyrene may be broken at about 1.5% elongation at room temperature. However, in "Polymer, 1993, vol. 34 (10), 2148-2154", it is reported that, by laminating a layer made of ductile material and a layer made of polystyrene and limiting a thickness of the layer made of polystyrene to 1 µm or less, the brittleness of the layer made of polystyrene is reformed to become ductile. That is, it is considered that a layer made of a brittle material such as polystyrene may be reformed to become tough when the thickness thereof is significantly reduced. The present inventors, by focusing on such a concept, have found a multilayer structure that may achieve both excellent gas barrier property and crack resistance.

As illustrated in FIG. 1, also, a thickness T of the whole multilayer structure 1 according to the present invention is preferably in a range of 0.1 to 1000 µm, more preferably in a range of 0.5 to 750 µm, particularly preferably in a range of 1 to 500 µm. The multilayer structure having a thickness within these ranges may be suitably used as an inner liner for a pneumatic tire and, in combination with limitation of an average thickness of each of the bather layer and the elastomer layer, may have further improved gas barrier property and crack resistance.

Further, the bather layer and the elastomer layer constituting the multilayer structure of the present invention are preferably crosslinked by irradiation of active energy rays. When the multilayer structure 1 is crosslinked by irradiation of the active energy rays, affinity between the laminated layers 2 and 3 is improved and high adhesion may be presented. As a result, interlayer adhesion of the multilayer structure, and thus the gas bather property and the crack resistance of the multilayer structure may be significantly improved. Note that the active energy rays may electromagnetic waves or charged particle beams having energy quantum and, as specific examples thereof, ultraviolet, γ rays, electron beams and the like may be mentioned. Among them, the electron beam is preferable in terms of an improving effect on the interlayer adhesion. When irradiating the electron beams as the active energy rays, various electron beam accelerators of such as, for example, Cockroft-Walton type, Van de Graft type, a resonance transformer type, an insulated core transformer type, a linear type, Dynamitron type, a high frequency type and the like may be used as an electron beam source. An acceleration voltage is usually 100 to 500 kV, and irradiation dose is usually in a range of 5 to 600 kGy. In irradiating ultraviolet as the active energy rays, ultraviolet including wavelength of 190 to 380 nm is preferably used. The ultraviolet source may be, but not particularly limited to, for example, a high-pressure mercury lamp, a low pressure mercury lamp, a metal halide lamp, a carbon arc lamp or the like.

Also, by improving the elastomer layer, an elastic modulus of the multilayer structure preferably becomes 40 Mpa or less under 100% strain at 20° C. This is because, when the elastic modulus under 100% strain at 20° C. exceeds 40 Mpa, flexibility of the multilayer structure becomes insufficient and followability to deformation may not be obtained, possibly deteriorating the fatigue resistance.

(Barrier Layer)

The bather layer constituting the multilayer structure according to the present invention is a layer containing a gas barrier resin, in order to substantialize an air bather property of the multilayer structure such that an internal pressure of the tire is maintained.

In terms of ensuring high air bather property of the multilayer structure, oxygen permeability of the bather layer at 20° C. and 65% RH is preferably 10.0 cc·mm/m$^2$·day·atm or less, more preferably 5.0 cc·mm/m$^2$·day·atm or less, particularly preferably 1.0 cc·mm/m$^2$·day·atm or less. When the oxygen permeability at 20° C. and 65% RH exceeds 10.0 cc·mm/m$^2$·day·atm, it becomes necessary to thicken the bather layer so as to enhance the internal pressure retention of the tire, which hinders sufficient weight reduction of the inner liner.

Also, the gas barrier resin is not particularly limited, as long as capable of ensuring a desired air barrier property. For example, polyamide resin, ethylene-vinyl alcohol copolymer, modified ethylene-vinyl alcohol copolymer, urethane polymer, olefin polymer, diene polymer and the like may be mentioned. Those resins may be used alone, or in combination with one or more other resins.

Further, the gas barrier resin is preferably at least one of resins having a polar group of OH, S, Cl or F. This is because, when the gas barrier resin has these polar groups, cohesive energy density is increased and, as a result, the gas bather property may be further improved.

Further, the resin having the polar group is preferably at least one selected from ethylene-vinyl alcohol copolymer, modified ethylene-vinyl alcohol copolymer, polyvinyl alcohol, nylon, polyvinyl chloride, and ionomer. This is because these resins have a low air transmission amount and excellent gas barrier property.

The ethylene-vinyl alcohol copolymer (EVOH) has ethylene content at preferably 25 to 50 mol %, more preferably 30 to 48 mol %, particularly preferably 35 to 45 mol %. When the ethylene content is less than 25 mol %, the crack resistance, the fatigue resistance and melt-moldability may be deteriorated; when the ethylene content exceeds 50 mol %, sufficient gas barrier property may not be ensured. Also, the ethylene-vinyl alcohol copolymer preferably has a saponification degree at 90% or higher, more preferably 95% or higher, particularly preferably 99% or higher. When the saponification degree is under 90%, the gas barrier property and thermal stability during molding may be insufficient. Further, the ethylene-vinyl alcohol copolymer has a melt flow rate (MFR), at 190° C. under a load of 2160 g, preferably 0.1 to 30 g/10 minutes, more preferably 0.3 to 25 g/10 minutes.

In terms of improving the gas barrier property, melt moldability and the interlayer adhesion of the inner liner, ethylene content of the ethylene-vinyl alcohol copolymer is preferably 3 to 70 mol %, more preferably 10 to 60 mol %, further preferably 20 to 55 mol %, particularly preferably 25 to 50 mol %. When the ethylene content is less than 3 mol %, there is a risk to deteriorate water resistance and hot water resistance of the inner liner, as well as the gas barrier property and the melt moldability at high humidity. On the other hand, when the ethylene content exceeds 70 mol %, the gas barrier property of the inner liner may possibly be reduced.

In terms of improving the gas barrier property, humidity resistance and the interlayer adhesion of the inner liner, the saponification degree of the ethylene-vinyl alcohol copolymer is preferably 80% or more, more preferably 90% or more, further preferably 95% or more, particularly preferably 99% or more. Also, the saponification degree of the ethylene-vinyl alcohol copolymer is preferably 99.99% or less. When the saponification degree of EVOH is less than 80%, there is a risk to deteriorate the melt moldability, the gas barrier property, coloring resistance and the humidity resistance of the inner liner.

In terms of obtaining the gas barrier property, the crack resistance and the fatigue resistance, melt flow rate (MFR) of the ethylene-vinyl alcohol copolymer at 190° C. under a load of 21.18 N is preferably 0.1 to 30 g/10 minutes, more preferably 0.3 to 25 g/10 minutes.

In the ethylene-vinyl alcohol copolymer, 1,2-glycol bond structural unit content G (mol %) preferably satisfies the following formula:

$$G \leq 1.58 - 0.0244 \times E$$

[in the formula, G represents the 1,2-glycol bond structural unit content (mol %), and E represents ethylene unit content (mol %) in the EVOH, where E≤64] and, simultaneously, intrinsic viscosity is preferably in a range of 0.05 to 0.2 L/g. When such EVOH is used, a resulting inner liner has less humidity dependency of the gas barrier property and excellent transparency and gloss, which facilitates lamination to a layer made of a different resin. Note that the 1,2-glycol bond structural unit content may be measured by, in accordance with a method described in "S. Aniya et al, Analytical Science Vol. 1, 91 (1985)", a nuclear magnetic resonance method at 90° C. using a dimethyl sulfoxide solution as an EVOH sample.

The modified ethylene-vinyl alcohol copolymer is a polymer containing, in addition to ethylene unit and vinyl alcohol unit, one or more repeating units (hereinafter, also referred to as a structural unit) such as, for example, repeat units induced from these units. Note that preferable ethylene content, saponification degree, melt flow rate (MFR), 1,2-glycol bond structural unit content and intrinsic viscosity of the modified EVOH are similar to those of EVOH described above.

Preferably, the modified EVOH has at least one structural unit selected from, for example, structural units (I) and (II) shown below and, more preferably, contains the structural unit at a ratio of 0.5 to 30 mol % of a total structural units. Such a modified EVOH may improve flexibility and moldability of a resin or a resin composition, the interlayer adhesion, stretchability and thermoformability of the inner liner.

[Chemical formula 1]

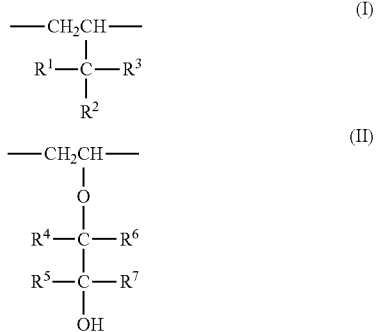

Each of $R^1$, $R^2$ and $R^3$ in the above formula (I) independently represents a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. Also, one pair of $R^1$, $R^2$ or $R^3$ may be combined together (excluding a pair of $R^1$, $R^2$ or $R^3$ in which both of them are hydrogen atoms). Further, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, a carboxy group or a halogen atom. On the other hand, each of $R^4$, $R^5$, $R^6$ and $R^7$ in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. $R^4$ and $R^5$, or $R^6$ and $R^7$ may be combined together (excluding when both $R^4$ and $R^5$ or both $R^6$ and $R^7$ are hydrogen atoms). Also, the aliphatic hydrocarbon group having 1 to 10 carbon atoms, the alicyclic hydrocarbon group having 3 to 10-carbon atoms, or the aromatic hydrocarbon group having 6 to 10 carbon atoms may have the hydroxy group, an alkoxy group, the carboxy group or the halogen atom.

In the modified EVOH, a lowest limit of an amount of the structure unit (I) and/or (II) with respect to the total structural units is preferably 0.5 mol %, more preferably 1 mol %, particularly preferably 1.5 mol %. Also, in the modified EVOH, the highest limit of the amount of the structure unit (I) and/or (II) with respect to the total structural units is preferably 30 mol %, more preferably 15 mol %, particularly preferably 10 mol %. When the specific amount of the structural unit (I) and/or (II) as described above are contained, the flexibility and processing characteristics of the resin or the resin composition, as well as the interlayer adhesion, the stretchability and the thermoformability of the inner liner may be improved.

For the structural units (I) and (II), as the aliphatic hydrocarbon group having 1 to 10 carbon atoms, an alkyl group, an alkenyl group and the like may be mentioned. As the alicyclic hydrocarbon group having 3 to 10 carbon atoms, a cycloalkyl group, a cycloalkenyl group and the like may be mentioned. As the aromatic hydrocarbon group having 6 to 10 carbon atoms, a phenyl group and the like may be mentioned.

In the structural unit (I), preferably, each of $R^1$, $R^2$ and $R^3$ independently represents a hydroxyethyl atom, a methyl group, an ethyl group, the hydroxy group, a hydroxymethyl group or a hydroxyethyl group. Among them, preferably, each of $R^1$, $R^2$ and $R^3$ independently represents the hydrogen atom, the methyl group, the hydroxy group or the hydroxymethyl group. Such $R^1$, $R^2$ and $R^3$ may further improve the stretchability and the thermoformability of the inner liner.

A method for incorporating the structural unit (I) in the EVOH may be, but not particularly limited to, for example, during copolymerization of ethylene and vinyl ester, a method of further copolymerizing a monomer induced by the structural unit (I). The monomer induced by the structural unit (I) may be, for example, alkenes such as propylene, butylene, pentene, hexene and the like; alkens having the ester group or the hydroxy group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1- hexene, 5-hydroxy-1-hexene, 6-hydroxy-1-hexene, 4-acyloxy-1-hexene, 5-acyloxy-1-hexene, 6-acyloxy-1-hexene, 5,6-diacyloxy-1-hexene and the like. Among them, in terms of copolymerization reactivity and the gas barrier property of the resulting inner liner, propylene, 3-acyloxy-1-propene, 3-acyloxy-1-butene, 4-acyloxy-1-butene, and 3,4-diacetoxy-1-butene are preferred. Specifically, propylene, 3-acetoxy-1-propene, 3-acetoxy-1-butene, 4-acetoxy-1-butene, 3,4-diacetoxy-1-butene are more preferable, and 3,4-diacetoxy-1-butene is particularly preferable. Note that, in using alkene having ester, during a saponification reaction, the monomer is induced by the structural unit (I).

In the structural unit (II) described above, both $R^4$ and $R^5$ are preferably hydrogen atoms. More preferably, both $R^4$ and $R^5$ are hydrogen atoms, and one of $R^6$ and $R^7$ is the aliphatic hydrocarbon group having 1 to 10 carbon atoms and the other is the hydrogen atom. The aliphatic hydrocarbon group in the structural unit (II) is preferably the alkenyl group or the alkyl group. Also, in terms of placing importance on the gas barrier property of the inner liner, one of $R^6$ and $R^7$ is preferably the methyl group or the ethyl group and the other is the hydrogen atom. Further, it is also preferable that one of $R^6$ and $R^7$ is a substituent group represented by $(CH_2)_hOH$ (h represents an integer of 1 to 8) and the other is the hydrogen atom. In the substituent group represented by $(CH_2)_hOH$, h preferably represents an integer of 1 to 4, more preferably 1 or 2, particularly preferably 1.

A method of incorporating the structural unit (II) in the EVOH may be, but not particularly limited to, a method to react a monovalent epoxy compound to EVOH obtained by the saponification reaction. The monovalent epoxy compound may be preferably a compound represented by the following formulas (III) to (IX).

[Chemical formula 2]

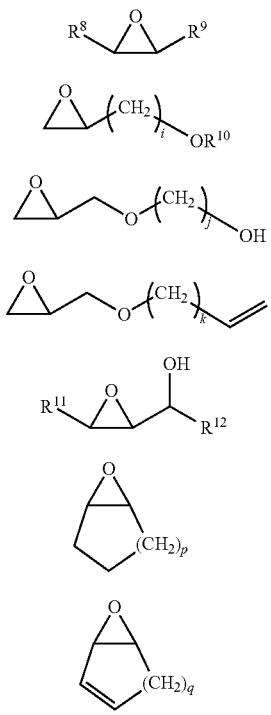

In the above formulas (III) to (IX), $R^8$, $R^9$, $R^{10}$, $R^{11}$ and $R^{12}$ represent the hydrogen atom, the aliphatic hydrocarbon group (the alkyl group or the alkenyl group) having 1 to 10 carbon atoms, the alicyclic hydrocarbon group (the cycloalkyl group or the cycloalkenyl group) having 3 to 10 carbon atoms, or the aromatic hydrocarbon group (the phenyl group and the like) having 6 to 10 carbon atoms. Note that $R^8$ and $R^9$, or $R^{11}$ and $R^{12}$ may be identical or different from each other. Also, i, j, k, p and q represent integers of 1 to 8.

The monovalent epoxy compound represented by the above formula (III) may be, for example, epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyhexane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 6-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-propane, 3-phenyl-1,2-epoxypropane, 1-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, or the like.

The monovalent epoxy compound represented by the above formula (IV) may be, for example, methyl glycidyl ether, ethyl glycidyl ether, n-propyl glycidyl ether, isopropyl glycidyl ether, n-butyl glycidyl ether, isobutyl glycidyl ether, tert-butyl glycidyl ether, 1,2-epoxy-3-pentyloxypropane, 1,2-epoxy-3-hexyloxypropane, 1,2-epoxy-3-heptyloxypropane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butoxyheputane, 1,2-epoxy-8-methoxyoctane, 1,2-epoxy-8-ethoxyoctane, 1,2-epoxy-8-butoxyoctane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, or the like.

The monovalent epoxy compound represented by the above formula (V) may be, for example, ethylene glycol monoglycidyl ether, propanediol monoglycidyl ether, butanediol monoglycidyl ether, pentanediol monoglycidyl ether, hexanediol monoglycidyl ether, heptanediol monoglycidyl ether, octanediol monoglycidyl ether, or the like.

The monovalent epoxy compound represented by the above formula (VI) may be, for example, 3-(2,3-epoxy) propoxy-1-propene, 4-(2,3-epoxy) propoxy-1-butene, 5-(2,3-epoxy) propoxy-1-pentene, 6-(2,3-epoxy) propoxy-1-hexene, 7-(2,3-epoxy) propoxy-1-heptene, 8-(2,3-epoxy) propoxy-1-octene, or the like.

The monovalent epoxy compound represented by the above formula (VII) may be, for example, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, or the like.

The monovalent epoxy compound represented by the above formula (VIII) may be, for example, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, or the like.

The monovalent epoxy compound represented by the above formula (IX) may be, for example, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, or the like.

Among the monovalent epoxy compounds set forth above, epoxy compounds having 2-8 carbon atoms are preferred. In particular, in terms of facilitating handling the compound and reactivity to EVOH, the number of carbon atoms of the monovalent epoxy compound is more preferably 2 to 6, particularly preferably 2 to 4. Also, the monovalent epoxy compound is particularly preferably a compound expressed by the formula (III) or the formula (IV) among compounds represented by above formulas. Specifically, in terms of reactivity to EVOH and the gas barrier property of the resulting inner liner, 1,2-epoxybutane, 2,3-epoxybutane, epoxypropane, epoxyethane and glycidol are preferable and, among them, epoxypropane and glycidol are particularly preferable.

According to the present invention, ethylene-vinyl alcohol copolymer may be obtained by polymerizing ethylene and vinylester to obtain ethylene-vinylester copolymer and saponifying the ethylene-vinylester copolymer. Further, modified ethylene-vinyl alcohol copolymer may be obtained by, as described above, (1) during polymerization of ethylene and vinylester, further copolymerizing a monomer induced by the structural unit (1), or (2) reacting a monovalent epoxy compound to EVOH obtained by the saponification reaction. Here, a polymerization method of ethylene-vinyl alcohol copolymer or modified ethylene-vinyl alcohol copolymer may be any one of, but not particularly limited to, for example, solution polymerization, suspension polymerization, emulsion polymerization, and bulk polymerization. Also, the method may be either a continuous mode or a batch-wise mode.

Vinylester that may be used for the polymerization may be fatty acid vinyl such as vinyl acetate, vinyl propionate, vinyl pivalate, and the like.

Further, in producing modified ethylene-vinyl alcohol copolymer, in addition to ethylene and vinylester, preferably a small amount of a monomer that may be copolymerized with monomers thereof may be used. The monomer that may be copolymerized with the monomers of ethylene and vinylester may be, in addition to monomers induced by the aforementioned structural unit (I), other alkenes; unsaturated carboxylic acid such as acrylic acid, methacrylic acid, crotonic acid, maleic acid and itaconic acid, or an anhydride thereof, or a salt thereof, monoalkylester, dialkylester and the like; nitriles such as acrylonitrile and methacrylonitrile; amides such as acrylamide, methacrylamide and the like; olefine sulfonic acid such as vinyl sulfonic acid, allylsulfonic acid, methallyl sulfonic acid, and the like or a salt thereof; alkylvinylethers, vinyl ketones, N-vinylpyrrolidone, vinyl chloride, vinylidene chloride, and the like. Further, vinylsilane compound may be used as a monomer, and an amount thereof mixed into the copolymer is preferably from 0.0002 mol % to 0.2 mol %. The vinylsilane compound may be, for example, vinyl trimethoxysilane, vinyl triethoxysilane, vinyl tri (β-methoxy-ethoxy) silane, γ-methacryloyloxypropyl methoxysilane, or the like. Among these vinylsilane compounds, vinyl trimethoxysilane and vinyl triethoxysilane are preferable.

A solvent that can be used for the polymerization is not particularly limited, as long as it is an organic solvent capable of dissolving ethylene, vinyl ester and ethylene-vinyl ester copolymer. Specifically, alcohols such as methanol, ethanol, propanol, n-butanol and tert-butanol; dimethyl sulfoxide, and the like may be mentioned. Among them, in terms of facilitating removal and separation after reaction, methanol is particularly preferred.

Initiators that may be used for the polymerization may be, for example, azonitorile based initiators such as 2,2'-azobisisobutyronitrile, 2,2'-azobis-(2,4-dimethyl valeronitrile), 2,2'-azobis-(4-methoxy-2,4-dimethylvaleronitrile), 2,2'-azobis-(2-cyclopropylpropionitrile), and the like; or organic peroxide initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide, and the like.

Polymerization temperature is typically about 20 to 90° C., preferably 40 to 70° C. Polymerization time is typically about 2- to 15 hours, preferably 3 to 11 hours. A polymerization rate to the vinyl ester used as a basis is typically about 10 to 90%, preferably 30 to 80%. Resin content in the solution after the polymerization is about 5 to 85 mass %, preferably 20 to 70 mass %.

After the polymerization is carried out for a predetermined time, or after a predetermined polymerization rate is achieved, a polymerization inhibitor is added to a resulting copolymer solution as necessary, and unreacted ethylene gas is removed by evaporation, followed by removal of unreacted vinyl ester. An applicable method of removing the unreacted vinyl ester is, for example, a method to continuously supply the copolymer solution at a constant speed from a top of a column packed with Raschig ring and to blow organic solvent vapor such as methanol and the like from a bottom of the column, such that mixed vapor of the organic solvent such as methanol and the like and unreacted vinyl ester is distilled from the top of the column and the copolymer solution from which the unreacted vinyl ester is removed is extracted from the button of the column.

Next, an alkali catalyst is added to the copolymer solution, such that the copolymer in the solution is saponified. A method of the saponification may be of either the continuous mode or the batch-wise mode. The alkali catalyst may be, for example, sodium hydroxide, potassium hydroxide, alkali metal alcoholates or the like. Further, a preferable condition of the saponification is, for the batch-wise mode, for example, a concentration of the alkali catalyst in the copolymer solution is about 10 to 50 mass %, reaction temperature is about 30 to 65° C., an amount of catalyst to be used is about 0.02 to 1.0 moles per mole of vinyl ester structural unit, and a saponification time is about 1 to 6 hours.

Since the (modified) EVOH after saponification reaction contains the alkali catalyst, byproduct salts such as sodium acetate and potassium acetate, and other impurities, these chemicals are preferably neutralized or removed by washing as needed. Here, when the (modified) EVOH after saponification reaction is washed in the water such as ion-exchanged water that hardly contains metal ions, chloride ions and the like, some of sodium acetate, potassium acetate and the like may remain in the EVOH.

As specific types of the nylon, for example, nylon 6, nylon 6-66, nylon MXD6, aromatic polyamide and the like may be mentioned.

Polyvinyl alcohol resin (PVA) is one kind of synthetic resins and characterized in being highly hydrophilic and soluble in warm water. In terms of improving the gas bather property, the melt moldability and the interlayer adhesion of the inner liner, the saponification degree of the PVA is preferably 95 mol % or less, more preferably 90 mol % or less.

According to the present invention, the polyvinyl alcohol resin may be obtained by, for example, saponifying polyvinyl acetate obtained by polymerizing vinyl acetate monomers.

Also, elongation at break (EB) of the barrier layer is preferably 100% or less. This is because, when the elongation at break exceeds 100%, there is a possibility that a high gas barrier property may not be secured. Here, the elongation at break (EB) represents the elongation at break when, under the condition of 20° C. and 65% RH conforming to ISO 527, a sample with a thickness of 1 mm is measured at a tensile rate of 500 mm/min by using a JIS No. 3 dumbbell.

(Elastomer Layer)

The elastomer layer constituting the multilayer structure of the present invention is a layer for imparting the crack resistance and the crack resistance to the multilayer structure and may be, for example, a layer made of thermoplastic elastomer or a layer made of a thermoplastic elastomer composition in which the thermoplastic elastomer exists in a matrix manner. Note that the matrix means a continuous phase. The bather layer described above has a high gas barrier property and is very effective in improving the internal pressure retention of the tire. However, since the bather layer has a significantly high elastic modulus comparing to that of rubber of the tire, there is a risk to break or generate cracks due to deformation during bending. Therefore, by laminating the elastomer layer together with the bather layer, high internal pressure retention and crack resistance of the multilayer structure may be ensured.

Also, the elongation at break (EB) of the elastomer layer preferably exceeds 100%. When the elongation at break (EB) is less than 100%, due to insufficient flexibility of the elastomer layer, a desired fatigue resistance may not be obtained. Here, the elongation at break (EB) represents the elongation at break when, under the condition of 20° C. and 65% RH conforming to ISO 527, a sample with a thickness of 1 mm is measured at the tensile rate of 500 mm/min by using the JIS No. 3 dumbbell.

Preferably, oxygen permeability of the elastomer layer at 20° C. and 65% RH is 10.0 cc·mm/m$^2$·day·atm or less. This is because, when the air oxygen permeability exceeds 10.0 cc·mm/m$^2$·day·atm, there is a risk that, when cracks are generated in the barrier layer, a rapid reduction of the internal pressure may not be prevented.

Also, JIS-A hardness of the elastomer layer is preferably 85 or less. Thereby, the flexibility of the entire multilayer structure may be ensured and, when the elastomer layer is used for the inner liner and the like and the multilayer structure deforms due to deformation of the rubber, the inner liner may follow the deformation of the rubber and, as a result, excellent fatigue resistance may be achieved.

Here, the reason to set the JIS-A hardness of the elastomer layer to 85 or less is because, when the JIS-A hardness of the elastomer layer exceeds 85, there is a risk that sufficient flexibility of the multilayer structure may not be ensured and a desired fatigue resistance may not be obtained. The JIS-A hardness of the elastomer layer is preferably 75 or less, more preferably 70 or less. A lower limit of the JIS-A hardness of the elastomer layer is preferably, but not particularly limited to, 20 or more. When the JIS-A hardness of the elastomer layer is below 20, formation of the elastomer layer may possibly become difficult.

Note that the JIS-A hardness is a standard for a measurement of hardness of rubber that quantifies a deformation amount (depth of depression) measured by an indenter pressing down a surface of a measurement object by using a spring-type hardness scale specified by JIS K6301-1975.

The elastomer component contained in the elastomer layer may be, but not particularly limited to, for example, polystyrene-based thermoplastic elastomer, polyolefin-based thermoplastic elastomer, polydiene-based thermoplastic elastomer, polyvinyl chloride-based thermoplastic elastomer, chlorinated polyethylene-based thermoplastic elastomer, polyurethane-based thermoplastic elastomer, polyester-based thermoplastic elastomer, polyamide-based thermoplastic elastomer, fluorocarbon resin-based thermoplastic elastomer, and the like. Among them, polyurethane-based thermoplastic elastomer is preferred. Note that those thermoplastic elastomers may be used alone, or in combination with one or more other thermoplastic elastomers.

The polystyrene-based thermoplastic elastomer has an aromatic vinyl polymer block (hard segment) and a rubber block (soft segment), where an aromatic vinyl polymer portion forms a physical crosslinking and functions as a bridging point, while the rubber block imparts rubber elasticity. The polystyrene-based thermoplastic elastomer may be sorted by an array format of the soft segment in the molecule, and may be, for example, styrene-butadiene-styrene block copolymer (SBS), styrene-isoprene-styrene block copolymer (SIS), styrene-isobutylene-styrene block copolymer (SIBS), styrene-ethylene/butylene-styrene block copolymer (SEBS), styrene-ethylene/propylene-styrene block copolymer (SEPS), or the like. Further, a block copolymer of crystalline polyethylene, which is obtained by hydrogenating a block copolymer of polybutadiene and butadiene-styrene random copolymer, and ethylene/butylene-styrene random copolymer; and di-block copolymer of, for example, crystalline polyethylene, which is obtained by hydrogenating a block copolymer of polybutadiene or ethylene-butadiene random copolymer, and polystyrene, are also included. Among them, in terms of balancing mechanical strength, heat stability, weather resistance, chemical resistance, the gas bather property, flexibility and workability, styrene-isobutylene-styrene block copolymer (SIBS), styrene-ethylene/butylene-styrene block copolymer (SEBS), and styrene-ethylene/propylene-styrene block copolymer (SEPS) are preferable.

The polyolefin-based thermoplastic elastomer includes thermoplastic elastomer containing a polyolefin block such as polypropylene, polyethylene and the like as the hard segment and a rubber block such as ethylene-propylene-diene copolymer and the like as the soft segment. Incidentally, such thermoplastic elastomer is classified into a blend type and an implant type. Further, as the polyolefin-based thermoplastic elastomer, maleic anhydride modified ethylene-butene-1 copolymer, maleic anhydride modified ethylene-propylene copolymer, halogenated butyl rubber, modified polypropylene, modified polyethylene, and the like may be mentioned.

As the polydiene-based thermoplastic elastomer, 1,2-polybutadiene-based TPE, trans-1,4-polyisoprene-based TPE, hydrogenated and conjugated diene-based TPE, epoxidized natural rubber, and the like may be mentioned. 1,2-Polybutadiene-based TPE is polybutadiene having 1,2-binding at 90% or more in the molecule, and composed of crystalline syndiotactic 1,2-polybutadiene as the hard segment and amorphous 1,2-polybutadiene as the soft segment. Also, trans-1,4-polyisoprene-based TPE is polyisoprene having a structure of trans-1,4 at 98% or more in the molecule, and composed of crystalline trans 1,4 segments as the hard segment and amorphous trans 1,4 segments as the soft segment.

In general, polyvinyl chloride-based thermoplastic elastomer (TPVC) is roughly classified into the following three types.

Type 1: High Molecular Weight Polyvinyl Chloride (PVC)/Plasticized Polyvinyl Chloride (PVC) Blended TPVC This is thermoplastic elastomer containing high molecular weight PVC as the hard segment and PVC plasticized with a plasticizer as the soft segment. Since the high molecular weight PVC is used as the hard segment, a micro-crystalline portion has a function as the crosslinking point.

Type 2: Partially Crosslinked PVC/Plasticized PVC Blended TPVC

This is thermoplastic elastomer containing PVC having partial crosslinking or branched structure as the hard segment and PCV plasticized by the plasticizer as the soft segment.

Type 3: PVC/Elastomer-Alloy Type TPVC

This is thermoplastic elastomer containing PVC as the hard segment and rubber such as partially crosslinked nitrile butadiene rubber (NBR) or TPE such as polyurethane-based TPE, polyester-based TPE and the like as the soft segment.

The chlorinated polyethylene-based thermoplastic elastomer is a soft resin that is obtained by reacting polyethylene with chlorine gas in a solvent such as aqueous suspension or carbon tetrachloride, and has crystalline polyethylene block as the hard segment and chlorinated polyethylene (CPE) block as the soft segment. Note that, in the CPE block, both components of polyethylene and chlorinated polyethylene are mixed as a multi-block mixture of a random structure mixture.

The polyester-based thermoplastic elastomer (TPEE) is a multi-block copolymer having polyester as the hard segment in the molecule and polyether or polyester with low glass transition temperature (Tg) as the soft segment. TPEE may be categorized into the types described below based on a molecular structure, and mainly categorized into polyester-polyether type TPEE and polyester-polyester type TPEE.

(1) Polyester-Polyether Type TPEE

In general, this is thermoplastic elastomer containing aromatic crystalline polyester as the hard segment and polyether as the soft segment.

(2) Polyester-Polyester Type TPEE

This is thermoplastic elastomer containing aromatic crystalline polyester as the hard segment and aliphatic polyester as the soft segment.

(3) Liquid Crystal TPEE

This is thermoplastic elastomer containing rigid liquid crystal molecules as the hard segment and aliphatic polyester as the soft segment.

The polyamide-based thermoplastic elastomer (TPA) is a multi-block copolymer containing polyamide as the hard segment and polyether or polyester with a low Tg as the soft segment. Polyamide component composing the hard segment is selected from nylon 6, 66, 610, 11, 12, and the like, and mainly from nylon 6 and nylon 12. As a structure material of the soft segment, long-chain polyol such as polyether diols, polyester diols and the like may be used. Typical examples of polyether polyols may be diol poly(oxy tetramethylene) glycol (PTMG), poly (oxypropylene) glycol, and the like. Typical examples of polyester polyols may be poly (ethylene adipate) glycol, poly (butylene-1,4 adipate) glycol, and the like.

The fluorine resin-based thermoplastic elastomer is an ABA block copolymer containing fluorine resin as the hard segment and fluorine rubber as the soft segment. The fluorine resin composing the hard segment may be tetrafluoroethylene-ethylene copolymer, polyvinylidene fluoride (PVDF), or the like. The fluorine rubber composing the soft segment may be vinylidene fluoride-hexafluoropropylene-tetrafluoroethylene terpolymers or the like. More specifically, vinylidene fluoride rubber, tetrafluoroethylene-propylene rubber, tetrafluoroethylene-perfluoro methyl vinyl ether rubber, phosphazene type fluorine rubber, fluoro polyether, fluoronitroso rubber, perfluoro triazine, and the like may be contained. In fluorine resin-based TPE, microphase separation is occurred in a manner similar to other TPE and the hard segment forms the crosslinking point.

The polyurethane-based thermoplastic elastomer (TPU) is a straight-chain multi-block copolymer composed of (1) polyurethane obtained by reaction between short chain glycol and isocyanate as the hard segment and (2) polyurethane obtained by reaction between long chain glycol and isocyanate as the soft segment. Here, polyurethane is a general term of compounds having a urethane linkage (—NHCOO—) obtained by a polyaddition reaction (urethane-forming reaction) of isocyanate (—NCO) and alcohol (—OH). According to the multilayer structure of the present invention, when elastomer forming the elastomer layer is TPU, the stretchability and the thermoformability may be improved by laminating the elastomer layer. Further, since such an inner liner may have improved interlayer adhesion between the elastomer layer and the barrier layer, high durability such as high crack resistance and the like may be obtained and, when the inner liner is deformed in use, the gas barrier property and the stretchability may be maintained.

The TPU is composed of polymeric polyol, organic polyisocyanate, a chain extender, and the like. The polymeric polyol is a substance having multiple hydroxy groups and may be obtained by polycondensation, addition polymerization (for example, ring-opening polymerization), polyaddition and the like. The polymeric polyol may be, for example, polyester polyol, polyether polyol, polycarbonate polyol or cocondensates thereof (for example, polyester-ether-polyol), or the like. Among them, polyester polyol and polycarbonate polyol are preferable, and polyester polyol is particularly preferable. Note that those polymer polyols may be used alone, or in combination with one or more other polymer polyols.

Here, the polyester polyol may be prepared by, for example, in accordance with a conventional method, condensation of compound that may form dicarboxylic acids, esters thereof, or anhydrides thereof and a low molecular weight polyol by direct esterification or transesterification, or by ring-opening polymerization of lactones.

Dicarboxylic acid that may be used to generate polyester polyol may be, but not particularly limited to, dicarboxylic acid which is commonly used in the production of polyester. Specifically, the dicarboxylic acid may be aliphatic dicarboxylic acid having 4 to 12 carbon atoms such as succinic acid, glutaric acid, adipic acid, pimelic acid, suberic acid, azelaic acid, sebacic acid, dodecanedioic acid, methyl succinic acid, 2-methyl glutaric acid, trimethyl adipic acid, 2-methyloctanic diacid, 3,8-dimethyldecanic diacid, 3,7-dimethyldecanic diacid, and the like; cycloaliphatic dicarboxylic acid such as cyclohexanedicarboxylic acid and the like; aromatic dicarboxylic acid such as terephthalic acid, isophthalic acid, orthophthalic acid, naphthalene dicarboxylic acid, and the like. These dicarboxylic acids may be used alone, or in combination with one or more other dicarboxylic acids. Among them, aliphatic dicarboxylic acid having 6 to 12 carbon atoms is preferable, and adipic acid, azelaic acid and sebacic acid are particularly preferable. These dicarboxylic acids have a carbonyl group that more easily reacts with the hydroxy group and thus is capable of significantly improving the interlayer adhesion to the barrier layer.

The low molecular weight polyol that may be used to generate polyester polyol may be, but not particularly limited to, low molecular weight polyol that is commonly used in the production of polyester. Specifically, the low molecular weight polyol may be aliphatic diol having 2 to 15 carbon atoms such as ethylene glycol, diethylene glycol, triethylene glycol, propylene glycol, 1,3-propanediol, 2-methyl-1,3-propanediol, 1,3-butylene glycol, 1,4-butanediol, neopentyl glycol, 1,5-pentanediol, 3-methyl-1,5-pentanediol, 1,6-hexanediol, 1,8-octanediol, 2-methyl-1,8-octane diol, 2,7-dimethyl-1,8-octanediol, 1,9-nonanediol, 2-methyl-1,9-nonanediol, 1,10-decanediol, 2,2-diethyl-1,3-propanediol, and the like; or alicyclic diol such as 1,4-cyclohexanediol, cyclohexanedimethanol, cyclooctanedimethanol, dimethyl cyclooctanedimethanol, and the like; aromatic dihydric alcohol such as 1,4-bis(β-hydroxyethoxy) benzene and the like. These low molecular weight polyols may be used alone, or in combination with one or more other low molecular weight polyols. Among them, aliphatic diol having 5 to 12 carbon atoms having a methyl group in a side chain of 3-methyl-1,5-pentanediol, 2-methyl-1,8-octanediol, 2,7-dimethyl-1,8-octanediol, 1,9-nonanediol, 2,8-dimethyl-1,9-nonanediol, and the like are preferable. Polyester polyol obtained by using such aliphatic diol may easily react with a hydroxyl group and thus is capable of significantly improving the interlayer adhesion to the barrier layer. Further, together with the low molecular weight polyol, a small amount of low molecular weight polyol having three or more functional groups may be used. The low molecular weight polyol having three or more functional groups may be, for example, trimethylol propane, trimethylol ethane, glycerin, 1,2,6-hexane triol, and the like.

Lactones that may be used to generate the polyester polyol may be, for example, ε-caprolactone, β-methyl-δ-valerolactone and the like.

The polyether polyols may be, for example, polyethylene glycol, polypropylene glycol, polytetramethylene glycol, poly (methyltetramethylene) glycol, and the like. The polyether polyols may be used alone, or in combination with one or more other polyether polyols. Among them, polytetramethylene glycol is preferable.

The polycarbonate polyols may be, preferably, compound obtained from condensation polymerization of aliphatic diol having 2-12 carbon atoms such as, for example, 1,4-butanediol, 1,5-pentanediol, 1,6-hexanediol, 1,8-octanediol, 1,10-decanediol and the like or mixture thereof, by an action of diphenyl carbonate, phosgene and the like.

For the polymeric polyol, a lower limit of the number average molecular weight is preferably 500, more preferably 600, particularly preferably 700. On the other hand, an upper limit of the number average molecular weight of the polymeric polyol is preferably 8,000, more preferably 5,000, particularly preferably 3,000. When the number average molecular weight of the polymer polyol is less than the lower limit, compatibility with the organic polyisocyanate is so high that the elasticity of the resulting TPU becomes insufficient. Therefore, dynamic property such as the stretchability, and the thermoformability of the resulting inner liner may be deteriorated. On the other hand, when the number average molecular weight of the polymeric polyol exceeds the upper limit, the compatibility with the organic polyisocyanate is so low that mixing in the polymerization process becomes difficult. As a result, a stable TPU may not be obtained due to generation of mass in a gel state and the like. Note that the number average molecular weight of the polymer polyol is measured conforming to JIS-K-1577 and calculated on the basis of a hydroxy group value.

The organic polyisocyanate may be, but not particularly limited to, a known organic diisocyanate that is commonly used in the manufacture of TPU. As the organic diisocyanate, for example, aromatic diisocyanate such as 4,4'-diphenylmethane diisocyanate, tolylene diisocyanate, phenylene diisocyanate, xylylene diisocyanate, 1,5-naphthylene diisocyanate, 3,3'-dichloro-4,4'-diphenylmethane diisocyanate, toluoylene diisocyanate, and the like; and aliphatic diisocyanate or alicyclic diisocyanate such as hexamethylene diisocyanate, isophorone diisocyanate, 4,4'-dicyclohexylmethane diisocyanate, hydrogenated xylylene diisocyanate, and the like may be mentioned. Among them, in terms of capability to improve strength and the crack resistance of the resulting inner liner, 4,4'-diphenylmethane diisocyanate is preferable. These organic polyisocyanates may be used alone, or in combination with one or more other organic polyisocyanates.

The chain extender may be, but not particularly limited to, a known chain extender commonly used in the manufacture of TPU, and low molecular weight compounds having 300 or less molecules having two or more active hydrogen atoms capable of reacting with an isocyanate group in the molecule are preferably used. As the chain extender, for example, ethylene glycol, propylene glycol, 1,4-butanediol, 1,6- hexanediol, 1,4-bis(β-hydroxyethoxy) benzene, 1,4-cyclohexanediol, and the like may be mentioned. Among them, in terms of further improving the stretchability and the thermoformability of the resulting inner liner, 1,4-butanediol is particularly preferred. These chain extenders may be used alone, or in combination with one or more other chain extenders.

The method of producing the TPU may be a manufacturing method using the polymer polyol, the organic polyisocyanate and the chain extender and utilizing a known urethane-forming reaction technique, and either one of prepolymer method and a one-shot method may be used. In particular, carrying out melt polymerization substantially in the absence of solvent is preferable, and carrying out continuous melt polymerization using a multi-screw extruder is more preferable.

For the TPU, a ratio of mass of the organic polyisocyanate to total mass of polymer polyol and the chain extender [isocyanate/(polymeric polyol+chain extender)] is preferably 1.02 or less. When the ratio exceeds 1.02, there is a risk of deteriorating long-term operation stability at the time of molding.

(Method for Producing Multilayer Structure)

A method for producing the multilayer structure according to the present invention is not particularly limited, as long as it may satisfactorily laminate and adhere the barrier layer and the elastomer layer described above, and may be a known method such as, for example, coextrusion, hand setting, coating, bonding, adherence, and the like. Among them, a preferable method of producing the multilayer structure according to the present invention is to prepare a plurality of resin compositions and produce the multilayer structure comprising the barrier layer produced by a coextrusion method using those compositions. This is because the method has high productivity and may provide excellent interlayer adhesion.

In the co-extrusion method, the resin or the resin composition forming the bather layer is heated and melted, and then supplied to an extrusion die through each path from different extruders or pumps, extruded to the multilayer from the extrusion die, and adheres in a laminating manner. Thereby, the multilayer structure according to the present invention is formed. As the extrusion die, for example, a multi-manifold die, a field block, a static mixer or the like may be used.

According to the multilayer structure of the present invention, also, on one side or on both sides thereof, a support layer for supporting the multilayer structure may be laminated. The support layer may be, but not particularly limited to, for example, a synthetic resin layer commonly used as a support layer. A laminating method of the support layer on the barrier layer and the elastomer layer may be, but not particularly limited to, for example, an adhesion method using an adhesive, an extrusion lamination method or the like.

<Inner Liner for Pneumatic Tire>

Next, with reference to the drawings, the inner liner of the present invention for a pneumatic tire and the pneumatic tire according to the present invention will be described in detail. The inner liner of the present invention for the pneumatic tire is characterized in using the multilayer structure described above.

<Pneumatic Tire>

The pneumatic tire according to the present invention is characterized in comprising the inner liner. The pneumatic tire according to the present invention may be manufactured by applying the multilayer structure described above as an inner liner 12 and using a conventional method.

In the pneumatic tire of the present invention, rubber composing the tire and the inner liner 12 may adhere to each other by using adhesive.

Figure 2:
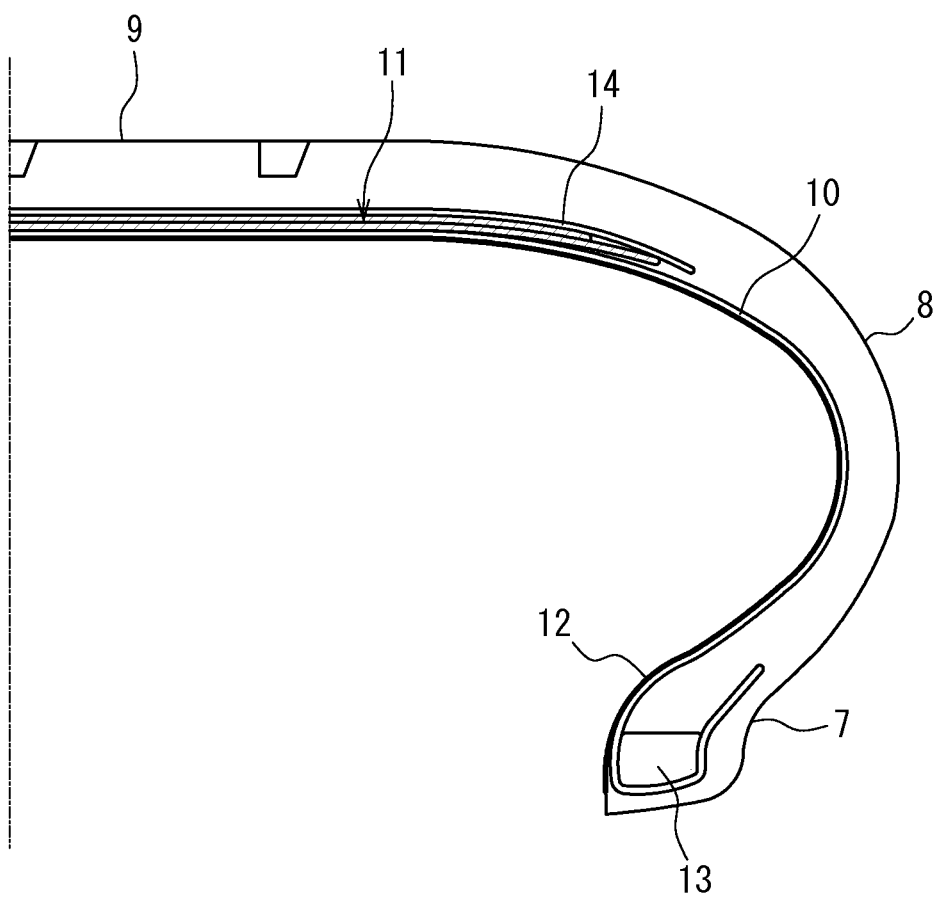
FIG. 2 is a partial cross-sectional view of an example of a pneumatic tire according to the present invention.

FIG. 2 is a partial cross-sectional view of an example of the pneumatic tire according to the present invention. The tire illustrated in FIG. 2 includes a pair of bead portions 7, a pair of sidewall portions 8, a tread portion 9 communicating with both of the sidewall portions 8, a carcass 10 troidally extending between the pair of bead portions 7 for reinforcing each of the portions 7, 8 and 9, and a belt 11 made up of two belt layers arranged outside a crown portion of the carcass 10 in a tire radial direction. Further, the inner liner 12 is disposed on a tire inner surface inside the carcass 10.

In the tire illustrated in the figure by way of example, the carcass 10 includes a main body portion troidally extending between a pair of bead cores 13, each of which is embedded in the bead portion 7, and a folding portion folded up radially outwardly from an inner side in a tire width direction around each of the bead cores 13. In the tire according to the present invention, however, the number of plies and a structure of the carcass 10 are not limited thereto.

Further, although the belt 11 in the tire illustrated in the figure by way of example is made up of two belt layers, the number of belt layers constituting the belt 11 in the tire according to the present invention is not limited thereto. Here, the belt layer is usually formed by using a rubberized layer of a code extending obliquely with respect to a tire equatorial plane and, in the two belt layers, codes constituting the belt layers are laminated to intersect with each other across the equatorial plane, thereby constituting the belt 11. Further, although the tire illustrated in the figure by way of example includes a belt reinforcing layer 14 disposed so as to cover the entire belt 11 outside the belt 11 in the tire radial direction, the tire of the present invention does not need to have the belt reinforcing layer 14, or may have a belt reinforcing layer with another structure. Here, usually, the belt reinforcing layer 14 is formed by the rubberized layer of codes arranged in substantially parallel with respect to a tire circumferential direction.

EXAMPLES

The following describes the present invention in more detail by using Examples. However, the present invention is not limited to the following Examples in any manners.

(Elastomer Layer)

Thermoplastic polyurethane (TPU) produced by Kuraray Co., Ltd.: "Kuramiron U9185", "Kuramiron U9190", "Kuramiron U9180", "Kuramiron U8175", "Kuramiron U8170", or "Kuramiron U8165" was used as the elastomer layer (see Table 1). Elongation at break of each elastomer layer is shown in Table 1.

(Barrier Layer)

As a barrier layer made of ethylene-vinyl alcohol copolymer, "EVAL F101B" produced by Kuraray Co., Ltd. was used.

(Samples 1-14 of Examples and Comparative Examples)

Thereafter, in order to form a multilayer structure comprising the number of layers and the thickness shown in Table 1 by using materials of the barrier layer and the elastomer layer, when using the barrier layer 1 and the barrier layer 2 at 210° C., the melt at 220° C. was supplied from the co-extruder to a feed block, from which the melt was extruded. Thereby, the multilayer structure was produced.

Thus obtained multilayer structure was quenched on a casting drum having a surface temperature maintained at 25° C., to which electrostatic is applied. A cast film obtained by quench was pressed against a release paper and wound up. Note that a shape of a flow path and a total ejection amount were set such that a time from merging of the melt to quench on the casting drum took approximately 4 minutes.

Cross-sections of the cast films obtained in the above manners were observed by using DIGITAL MICROSCOPE VHX-900 (manufactured by KEYENCE CORPORATION) or an electron microscope VE-8800 (manufactured by KEYENCE CORPORATION), such that an average thickness of each of the layers and a thickness of the multilayer structure were obtained. Results are shown in Table 1.

Subsequently, to each sample cast film, by using an electron beam accelerator [Cure Tron EB200-100 manufactured by NHV Corporation], electron beams in an irradiation dose shown in Table 1 were irradiated at an acceleration voltage of 200 kV. Thereby, a crosslinked multilayer film (multilayer structure) was obtained.

Next, the gas barrier property, the fatigue resistance and the internal pressure retention of a sample multilayer film produced in the above manner were evaluated in the following manners. Results are shown in Table 1.

(1) Gas Barrier Property

The above film was humidity-conditioned at 20° C. and 65% RH for 5 days. For two resulting humidity-conditioned films, by using MOCON OX-TRAN2/20 type manufactured by Modern Control Co. Ltd., conforming to JIS K7126 (equal pressure method) under the condition of 20° C. and 65% RH, the oxygen permeability was measured and an average thereof was obtained. For the gas barrier property, evaluation was carried out using an index with respect to an oxygen permeability of a sample 1 as 100. The smaller the value is, the smaller the oxygen permeability is, which is the better result.

(2) Internal Pressure Retention

A tire manufactured in the above manner, in the atmosphere of −30° C. under the air pressure of 140 kPa, was pressed with a load of 6 kN on a drum rotating at a speed equivalent to 80 km/h and run for 10,000 km. Then, after mounting the tire (test tire) which has been running as described above on a rim of 6JJ×15, the tire was left standing still with the internal pressure at 240 kPa, for three months. Three month later, the internal pressure was measured and, by using the following formula:

Internal pressure retention=$((240-b)/(240-a))\times 100$

[in this formula, a represents the internal pressure (kPa) of the test tire of 3 months later, b represents an internal pressure (kPa) of a test tire of Comparative Example 1 of 3 month later], the internal pressure retention was evaluated. With a value of a sample 1 as 100, other values were represented by indexes. The larger the index is, the better the internal pressure retention is.

(3) Fatigue Resistance (the Number of Cracks after Low-Temperature Drum Running Test)

To the above film, an auxiliary layer, which is a rubber composition layer with a thickness of 500 μm, was adhered and EB was irradiated. Then, adhesive (Ogasawara ENR adhesive) was applied to the film, which was then bonded to an inner surface as the auxiliary layer. Thereby, the inner liner was produced. By using thus produced inner liner, as illustrated in FIG. 3, a pneumatic tire for a passenger car in size: 195/65R15 was produced by a conventional method.

Thus produced pneumatic tire, at room temperature (20° C.) under the air pressure at 140 kPa, was pressed with a load of 6 kN on a drum rotating at a speed equivalent to 80 km/h and run for 20,000 km. The number of cracks on a film surface of a tire shoulder portion of 10 cm×10 cm after running was measured to be used as an index of the fatigue resistance.

TABLE 1

| | | Sample | | | | | | |
|---|---|---|---|---|---|---|---|---|
| | | 1 Comparative Example | 2 Example | 3 Example | 4 Example | 5 Example | 6 Example | 7 Example |
| Barrier Layer | Type | F101B | F101B | F101B | F101B | F101B | F101B | F101B |
| | Elongation at Break (%) | 15 | 15 | 15 | 15 | 15 | 15 | 15 |
| | Average Layer Thickness (μm) | 2 | 2 | 2 | 2 | 2 | 2 | 2 |
| | Number of Layers | 4 | 4 | 4 | 4 | 4 | 4 | 4 |
| | Oxygen Permeability Modulus (cm3 · 20 μm/m² · 24 hrs · atm) | 0.4 | 0.4 | 0.4 | 0.4 | 0.4 | 0.4 | 0.4 |
| Elastomer Layer | Type | Kuramiron U9195 | Kuramiron U9195 | Kuramiron U9195 | Kuramiron U9195 | Kuramiron U9195 | Kuramiron U9195 | Kuramiron U9195 |
| | TPU hardness (JIS-A) | 95 | 95 | 95 | 95 | 95 | 95 | 95 |
| | Elongation at Break (%) | 610 | 610 | 610 | 610 | 610 | 610 | 610 |
| | Average Layer Thickness (μm) | 2 | 4 | 6 | 8 | 12 | 18 | 24 |
| | Number of Layers | 5 | 5 | 5 | 5 | 5 | 5 | 5 |
| Total Number of Layers | | 9 | 9 | 9 | 9 | 9 | 9 | 9 |
| Thickness of Multilayer Structure (μm) | | 18 | 28 | 38 | 48 | 68 | 98 | 128 |
| Proportion of a Thickness of Elastomer Layers in Multilayer Structure (%) | | 55.6 | 71.4 | 78.9 | 83.3 | 88.2 | 91.8 | 93.8 |
| Elastic Modulus of Multilayer Structure at 20° C. and 100% strain (Mpa) | | 35 | 25 | 28 | 23 | 18 | 15 | 10 |
| | Electron Beam Amount (kGy) | 100 kGy | 100 kGy | 100 kGy | 100 kGy | 100 kGy | 100 kGy | 100 kGy |
| | Gas Barrier Property (Index) | 100 | 100 | 100 | 100 | 100 | 100 | 100 |
| | Internal Pressure Retention (Index) | 100 | 100 | 100 | 100 | 100 | 100 | 100 |
| | Fatigue Resistance (Cracks) (Number) | 50 | 28 | 23 | 10 | 5 | 0 | 0 |

TABLE 1-continued

| | | Sample | | | | | | |
|---|---|---|---|---|---|---|---|---|
| | | 8 Comparative Example | 9 Example | 10 Example | 11 Example | 12 Example | 13 Example | 14 Example |
| Barrier Layer | Type | F101B | F101B | F101B | F101B | F101B | F101B | F101B |
| | Elongation at Break (%) | 15 | 15 | 15 | 15 | 15 | 15 | 15 |
| | Average Layer Thickness (μm) | 2 | 2 | 2 | 2 | 2 | 2 | 2 |
| | Number of Layers | 4 | 4 | 4 | 4 | 4 | 4 | 4 |
| | Oxygen Permeability Modulus ($cm^3 \cdot 20 \, \mu/m^2 \cdot 24 \, hrs \cdot atm$) | 0.4 | 0.4 | 0.4 | 0.4 | 0.4 | 0.4 | 0.4 |
| Elastomer Layer | Type | Kuramiron U9195 | Kuramiron U9190 | Kuramiron U9185 | Kuramiron U9180 | Kuramiron U8175 | Kuramiron U8170 | Kuramiron U8165 |
| | TPU hardness (JIS-A) | 95 | 90 | 85 | 80 | 75 | 70 | 65 |
| | Elongation at Break (%) | 610 | 560 | 610 | 640 | 700 | 780 | 890 |
| | Average Layer Thickness (μm) | 2 | 4 | 6 | 8 | 12 | 18 | 24 |
| | Number of Layers | 5 | 5 | 5 | 5 | 5 | 5 | 5 |
| Total Number of Layers | | 59 9 | 9 | 9 | 9 | 9 | 9 | 9 |
| Thickness of Multilayer Structure (μm) | | 18 | 28 | 38 | 48 | 68 | 98 | 128 |
| Proportion of a Thickness of Elastomer Layers in Multilayer Structure (%) | | 55.6 | 71.4 | 78.9 | 83.3 | 88.2 | 91.8 | 93.8 |
| Elastic Modulus of Multilayer Structure at 20° C. and 100% strain (Mpa) | | 32 | 30 | 28 | 27 | 25 | 21 | 18 |
| Electron Beam Amount (kGy) | | 100 kGy | 100 kGy | 100 kGy | 100 kGy | 100 kGy | 100 kGy | 100 kGy |
| Gas Barrier Property (Index) | | 100 | 100 | 100 | 100 | 100 | 100 | 100 |
| Internal Pressure Retention (Index) | | 100 | 100 | 100 | 100 | 100 | 100 | 100 |
| Fatigue Resistance (Cracks) (Number) | | 56 | 31 | 35 | 5 | 0 | 0 | 0 |

As can be seen from the results shown in Table, the multilayer structure (multilayer film) of Examples, similarly to those of Comparative Examples, may achieve both high gas barrier property and high crack resistance. Also, as can be seen from the results shown in Table 1, the multilayer structure of Examples, comparing to those of Comparative Examples, have less cracks and achieves higher fatigue resistance.

INDUSTRIAL APPLICABILITY

According to the present invention, the multilayer structure having high gas bather property and crack resistance and, in particular, excellent fatigue resistance may be provided. Also, an inner liner for a pneumatic tire using such a multilayer structure and a pneumatic tire comprising the inner liner may be provided. Accordingly, since a pneumatic tire having gas bather property higher than that of conventional tires and durable for a prolonged use may be obtained, the present invention is industrially useful.

REFERENCE SIGNS LIST

1 multilayer structure
2 bather layer
3 elastomer layer
7 bead portion
8 sidewall portion
9 tread portion
10 carcass
11 belt
12 inner liner
13 bead core
14 belt reinforcing layer

The invention claimed is:

1. A multilayer structure comprising barrier layers and elastomer layers,
wherein a proportion of a thickness of the elastomer layers in the multilayer structure is 80% or more,
wherein each barrier layer consists of a resin of ethylene-vinyl alcohol copolymer and/or modified ethylene-vinyl alcohol copolymer,
wherein a thickness of each barrier layer is 10 μm or less,
wherein a thickness of each elastomer layer is within a range of 0.001 to 40 μm,
wherein an elastomer component contained in each elastomer layer is polyurethane-based thermoplastic elastomer, and JIS-A hardness of the elastomer layer is 85 or less,
wherein the barrier layers and the elastomer layers are alternately laminated to form a laminate having nine or more layers in total, and
wherein the laminate has top and bottom layers which are elastomer layers located in an external portion that are thicker than the barrier and elastomer layers sandwiched therebetween.

2. The multilayer structure according to claim 1, wherein elongation at break of the barrier layer conforming to ISO 527 at 20° C. and 65% RH is 100% or less.

3. The multilayer structure according to claim 1, wherein elongation at break of the elastomer layer conforming to ISO 527 at 20° C. and 65% RH exceeds 100%.

4. The multilayer structure according to claim 1, wherein the barrier layer and the elastomer layer are crosslinked by irradiation of active energy rays.

5. The multilayer structure according to claim 1, wherein an elastic modulus of the multilayer structure under 100% strain at 20° C. is 40 MPa or less.

6. The multilayer structure according to claim 1, wherein oxygen permeability of the barrier layer at 20° C. and 65% RH is 10.0 cc·mm/m²·day·atm or less.

7. The multilayer structure according to claim 1, wherein the barrier layer contains one or more resins having a polar group of OH, S, Cl or F.

8. The multilayer structure according to claim 1, wherein the barrier layer and the elastomer layer are formed by co-extrusion molding.

9. An inner liner for a pneumatic tire using the multilayer structure according to claim 1.

10. A pneumatic tire comprising the inner liner for a pneumatic tire according to claim 9.

* * * * *